(12) United States Patent
Henriksson et al.

(10) Patent No.: US 8,647,162 B2
(45) Date of Patent: Feb. 11, 2014

(54) MACHINERY ARRANGEMENT FOR MARINE VESSEL

(75) Inventors: Torbjörn Henriksson, Kaarina (FI); Marko Lehikoinen, Turku (FI)

(73) Assignee: Wartsila Finland Oy, Vaasa (FI)

( * ) Notice: Subject to any disclaimer, the term of this patent is extended or adjusted under 35 U.S.C. 154(b) by 504 days.

(21) Appl. No.: 12/935,173

(22) PCT Filed: Mar. 11, 2009

(86) PCT No.: PCT/FI2009/050193
§ 371 (c)(1),
(2), (4) Date: Sep. 28, 2010

(87) PCT Pub. No.: WO2009/125052
PCT Pub. Date: Oct. 15, 2009

(65) Prior Publication Data
US 2011/0023765 A1  Feb. 3, 2011

(30) Foreign Application Priority Data
Apr. 9, 2008  (FI) ...................................... 20085297

(51) Int. Cl.
*B63H 21/32* (2006.01)
*B63J 2/00* (2006.01)
*B63J 2/06* (2006.01)
*F01N 3/04* (2006.01)
*F01N 3/20* (2006.01)
*F01N 13/00* (2010.01)

(52) U.S. Cl.
USPC ........... 440/89 R; 114/211; 114/269; 60/281; 60/310

(58) Field of Classification Search
USPC .............. 114/211, 269, 382; 440/88 R, 89 R; 60/281, 282, 310
See application file for complete search history.

(56) References Cited

U.S. PATENT DOCUMENTS 3,063,219 A * 11/1962 Copcutt ............................. 96/18
3,389,829 A *  6/1968 Stanford ....................... 252/372

(Continued)

FOREIGN PATENT DOCUMENTS

CN           1594849 A      3/2005
CN         101082295 A     12/2007

(Continued)

*Primary Examiner* — Ajay Vasudeva
(74) *Attorney, Agent, or Firm* — Muncy, Geissler, Olds & Lowe, PLLC (57) ABSTRACT

The invention relates to a machinery arrangement for a marine vessel (1), which machinery arrangement (2) comprises a combustion unit (3), an exhaust gas duct assembly (4), which includes a first branch pipe (41) and a second branch pipe (42) and is connected to the combustion unit for receiving an exhaust gas flow and for leading the exhaust gas flow to the atmosphere, and an exhaust gas cleaning system (5) arranged in a flow direction of exhaust gas. In order to achieve an improved cleaning of the exhaust gas, a fan unit (6) and a first valve means (7) is provided in flow connection with the first branch pipe (41), which is connect to the exhaust gas cleaning system (5).

10 Claims, 5 Drawing Sheets

(56) References Cited

U.S. PATENT DOCUMENTS

| | | | |
|---|---|---|---|
| 3,693,557 A * | 9/1972 | Makuch | 110/342 |
| 3,776,164 A * | 12/1973 | Westrum | 440/89 R |
| 3,844,233 A * | 10/1974 | Fishback | 110/193 |
| 3,899,099 A * | 8/1975 | Oiestad | 220/88.3 |
| 3,929,434 A * | 12/1975 | Nelson | 95/236 |
| 4,531,463 A * | 7/1985 | Kratz et al. | 110/212 |
| 4,962,643 A | 10/1990 | Panten et al. | |
| 4,999,167 A * | 3/1991 | Skelley et al. | 422/175 |
| 6,358,109 B1 | 3/2002 | Neisen | |
| 6,402,816 B1 * | 6/2002 | Trivett et al. | 95/226 |
| 8,038,774 B2 * | 10/2011 | Peng | 95/210 |
| 2007/0175203 A1 | 8/2007 | Roozenboom | |
| 2007/0271905 A1 | 11/2007 | Muraguchi | |

FOREIGN PATENT DOCUMENTS

| | | | | |
|---|---|---|---|---|
| DE | 3816233 C1 | | 7/1989 | |
| FR | 2826931 A1 * | | 1/2003 | B63H 21/32 |
| JP | 08-091288 | | 4/1996 | |
| JP | 08121181 | | 5/1996 | |
| WO | WO 2005/023641 A1 | | 3/2005 | |
| WO | WO 2007/020025 A | | 2/2007 | |

* cited by examiner

MACHINERY ARRANGEMENT FOR MARINE VESSEL

TECHNICAL FIELD

The invention relates to a machinery arrangement for a marine vessel, which machinery arrangement comprises a number of combustion units, an exhaust gas duct assembly, which includes a first branch pipe and a number of second branch pipes connected to corresponding combustion units for receiving an exhaust gas flow and for leading the exhaust gas flow to the atmosphere, and an exhaust gas cleaning system arranged in a flow direction of the exhaust gas, whereby each second branch pipe is connected to a corresponding one of the combustion units and each first branch pipe is connected to a corresponding one of the second branch pipes, wherein the first branch pipe is arranged to lead the exhaust gas flow to the exhaust gas cleaning system and further to the atmosphere. A fan is unit provided in flow connection with the first branch pipes and a first valve means is provided in the first branch pipes, wherein the second branch pipes are arranged to function as stand-by exhaust pipes, wherein the machinery arrangement is the machinery arrangement of a marine vessel, wherein the combustion units are arranged in an engine room, the engine room is provided with an engine room ventilation outlet, and the engine room ventilation outlet is in flow connection with an enclosure, wherein the exhaust gas cleaning system comprises a scrubber unit provided with an exhaust gas pipe, and wherein the scrubber unit is arranged outside the enclosure. The present invention also relates to a method for operating a machinery arrangement of a marine vessel, the method comprising leading an exhaust gas flow from a number of combustion units to an exhaust gas cleaning system through an exhaust gas duct assembly, which includes a number of first branch pipes and a number of second branch pipes, whereby each second branch pipe is connected to a corresponding one of the combustion units for receiving an exhaust gas flow and for leading the exhaust gas flow to the atmosphere, and each first branch pipe is connected to a corresponding one of the second branch pipes, leading the exhaust gas flow to the atmosphere, wherein the exhaust gas flow is led to the exhaust gas cleaning system through the first branch pipes, the exhaust gas flow is controlled by a fan unit deployed in flow connection with the first branch pipes and by a first valve means deployed in the first branch pipes, and the second branch pipes are deployed as stand-by exhaust pipes, and conveying a ventilating flow from an engine room, where the combustion units are arranged, through a ventilation outlet to an enclosure, wherein the machinery arrangement is a machinery arrangement of a marine vessel, and wherein the exhaust gas cleaning system comprises a scrubber unit provided with an exhaust gas pipe, which scrubber unit is arranged outside the enclosure.

BACKGROUND ART

Machinery arrangements for marine vessels conventionally comprise one or more combustion units, such as diesel engines, oil-fired boilers, incinerators, etc. The combustion units usually have independent exhaust gas duct assemblies, whereby also the cleaning of exhaust gases takes place separately for each combustion unit.

Gases coming from oil-fired boilers are sometimes referred to as flue gases. Gases from diesel engines are mostly called exhaust gases. In the following the general term exhaust gas will be used with regard to gases from all relevant types of combustion units.

Reduction of exhaust gas emissions can be obtained by improving the performance of the combustion units, by using cleaner fuel, or by cleaning the exhaust gases.

In previously known solutions, with regard to cleaning the exhaust gases, machinery arrangements have been provided with exhaust gas cleaning systems for nitric oxides ($NO_x$). Presently, however, due to increasing demands to reduce exhaust gas emissions, especially in port conditions and near the coast, there will be a need to clean sulphuric oxides ($SO_x$) emanating from sulphur rich fuels, such as conventional heavy fuel oil.

Generally speaking, exhaust gas cleaning systems cause flow resistance in the exhaust gas duct assembly, which is undesirable in view of the efficiency of the exhaust gas cleaning and the operation of the combustion units.

SUMMARY OF THE INVENTION

An object of the present invention is to avoid the above mentioned problems and to provide a machinery arrangement effectively reducing exhaust gas emissions. This object is attained by the machinery arrangement and method of the present invention.

The basic idea of the invention is to avoid increased exhaust gas back pressure caused by cleaning devices, to reduce equipment for cleaning exhaust gases and to optimize cleaning performance in relation to the degree of operation of the combustion units. Firstly, the exhaust gas duct assembly is divided into a first branch pipe leading to the exhaust gas cleaning system and into a second branch pipe connected to and extending from the combustion unit, also leading to the atmosphere. Secondly, a fan unit is provided in flow connection with the first branch pipe and a first valve means is provided in the first branch pipe. Advantageously the exhaust gas from a number of combustion units connecting to corresponding first branch pipes and second branch pipes is cleaned by the same exhaust gas cleaning system.

In normal sea-going conditions, when the combustion units are driven at a given level with a given exhaust gas flow, the exhaust gas cleaning system may have a design performance for the corresponding combined load of the combustion units. Consequently, in port conditions or near the coast, when the combustion units normally are driven at a level far below said level for normal sea-going conditions and the exhaust gas flow is considerably smaller, the exhaust gas cleaning system will provide a higher cleaning performance corresponding to stricter requirements typical for port conditions and corresponding areas near the coast.

In order to be in flow connection with the first branch pipe, the fan unit can advantageously be arranged between the first branch pipe and the exhaust gas cleaning system. Alternatively, the fan unit can be arranged after the exhaust gas cleaning system in the flow direction of the exhaust gas. Yet another advantageous arrangement is to arrange the fan unit in the first branch pipe.

The first branch pipe is advantageously provided with a first valve means for regulating or closing off of the exhaust gas flow, and a possible air flow, in the first branch pipe.

In a machinery arrangement which comprises a number of combustion units, each of the combustion units is advantageously connected to corresponding first branch pipes and second branch pipes respectively.

In this case, the various first branch pipes are advantageously connected to a common collecting branch, which is connected to the exhaust gas cleaning system.

As one alternative, the fan unit is advantageously arranged in the common collecting branch.

The exhaust gas cleaning systems advantageously comprises a cleaning device for sulphuric oxides ($SO_x$). Said device advantageously comprises a scrubber unit provided with an exhaust gas pipe.

In a marine vessel where the combustion unit is arranged in an engine room, the engine room preferably comprises an engine room casing with an engine room ventilation outlet leading to an enclosure outside a funnel portion of the engine room casing.

In a marine vessel where the exhaust gas cleaning system comprises a scrubber unit with an exhaust gas pipe, the exhaust gas pipe is advantageously arranged in the enclosure. The scrubber unit is advantageously arranged outside the enclosure. This enhances the treatment of the exhaust gas discharge from the exhaust pipe.

By also arranging the first branch pipe in the enclosure, the treatment of the exhaust gas can be made yet more efficient.

In addition, it is advantageous that the enclosure is open-ended and is provided with a jacket portion surrounding at least part of the exhaust gas pipe.

Advantageous features of the machinery arrangement and method according to the present invention are given in the claims.

BRIEF DESCRIPTION OF DRAWINGS

In the following the invention will be described, by way of example only, with reference to the accompanying schematic drawing, in which.

DETAILED DESCRIPTION

Figure 1:
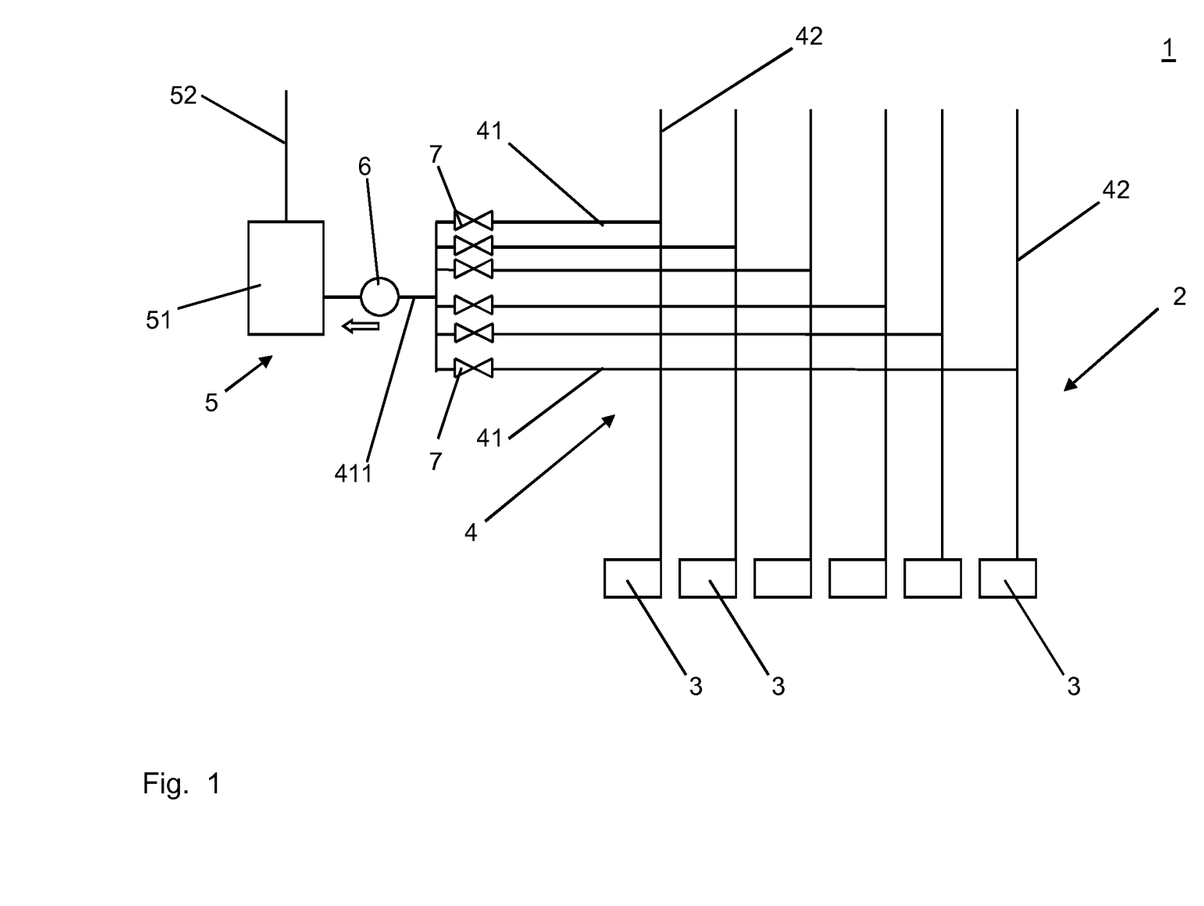
FIG. 1 illustrates a first embodiment of the present invention.

In FIG. 1 a machinery arrangement for a marine vessel 1 is generally indicated by reference sign 2. The machinery arrangement comprises a combustion unit 3, in this embodiment a number of combustion units. The combustion units may include diesel engines, oil-fired boilers, incinerators, etc.

Further, the machinery arrangement 2 comprises an exhaust duct assembly 4 for receiving an exhaust gas flow from the combustion units and for leading the exhaust gas flow to the atmosphere. The exhaust gases are treated by an exhaust gas cleaning system 5 arranged in the flow direction (main intended flow direction of the exhaust gas is indicated by a block arrow) of the exhaust gas. The exhaust gas cleaning system includes a cleaning device for sulphuric oxides ($SO_x$), e.g. a scrubber unit 51, which is provided with an exhaust gas pipe 52.

The exhaust gas duct assembly 4 includes a first branch pipe 41 leading to the exhaust gas cleaning system 5 and a second branch pipe 42 connected to and extending from the combustion unit 3, also leading to the atmosphere. An exhaust gas flow from the combustion unit 3 is firstly led into the second branch pipe 42 and further to the atmosphere, or alternatively from the second branch pipe 42 to the first branch pipe 41, through the exhaust gas cleaning system 5, and further to the atmosphere. This is discussed more in detail below.

In this embodiment, which includes a number of combustion units, each combustion unit 3 is connected to a first branch pipe 41 through a second branch pipe 42 respectively. A fan unit 6 is provided in flow connection with the first branch pipe 41 relating to each combustion unit 3. In this embodiment the fan unit 6 is arranged between the first branch pipes 41 and the exhaust gas cleaning system 5, in a common collecting branch 411, which connects the various first branch pipes and the scrubber unit 51.

Each of the first branch pipes 41 is provided with a first valve means 7, which advantageously is arranged to function as a shut-off valve and flow control valve.

In the following the operation of the machinery arrangement according to the invention shall shortly be described.

In operation, as one or more combustion units 3 are driven, exhaust gas is generated and is led into the exhaust gas duct assembly 4. The purpose is to draw substantially all of the exhaust gas by the fan unit 6 through the first branch pipes 41 and to push the exhaust gas via the common collecting branch 411 into the scrubber unit 51 in order to clean the same. The second branch pipes 42 basically function as stand-by exhaust pipe for the respective combustion units 3, preferably so that a minimum of fresh air is provided to the scrubber unit 51 in order to prevent escape of un-cleaned exhaust gases.

The fan unit 6 is advantageously equipped with a frequency converter and/or guide vanes for flexible control of its appropriate function in relation to the drive mode of the respective combustion units 3. Back-flow of exhaust gas from the common collecting branch 411 to other combustion units is controlled by the first valve means 7 provided in each first branch pipe 41. The first valve means 7 are arranged to balance the flow in the active first branch pipes 41, i.e. the first branch pipes connected to a driven combustion unit 3. On the other hand, the first valve means 7 are also arranged to shut-off the flow in the inactive first branch pipes 41, i.e. the first branch pipes connected to a non-operational combustion unit 3.

This arrangement also ensures that the exhaust gas back pressure, with regard to each combustion unit 3, remains about the same or slightly lower than in a conventional machinery installation.

In case e.g. of malfunction of the scrubber unit 51, the first valve means 7 can be used to prevent the flow of hot exhaust gases to the scrubber unit. In a situation like this, the exhaust gases can be led directly through the second branch pipes 42 to the atmosphere, whereby exhaust gas emission control may be achieved by using fuel with lower sulphur content.

Each of the second branch pipes 42 is advantageously provided with a second valve means (not shown), a temperature sensor (not shown) and a flow sensor (not shown).

The temperature sensors in the second branch pipes 42 can be used to control that there is no inadvertent flow of hot, un-cleaned exhaust gases into the atmosphere. The flow sensors in the second branch pipes 42 can correspondingly be used to control the flow of fresh air, i.e. said minimum of fresh air discussed above, provided to the scrubber unit 51. The second valve means may regulate the flow as such in the second branch pipes.

For optimizing the overall operation of the exhaust gas cleaning system the fan unit 6, the first valve means 7, and also as appropriate the second valve means, the temperature sensor and the flow sensor, are connected to a central control unit (not shown) for monitoring the exhaust gas flow.

In conclusion, such a central control unit provides the means to ensure that a minimum of fresh air continuously can be sucked backwards from the active second branch pipes, that the air flow to and therefore the exhaust gas load (combined air and exhaust gas flow) to the scrubber unit is minimised, and that power consumption can be optimised. Furthermore, by minimizing the flow of cold air from the second branch pipes, any risk for condensation of sulphuric acid at the point of mixing of said cold air and hot exhaust gases can be avoided.

The deployment of the central control unit remains within the knowledge of a person skilled in the art, and is therefore not discussed in more detail in this connection.

Figure 2:
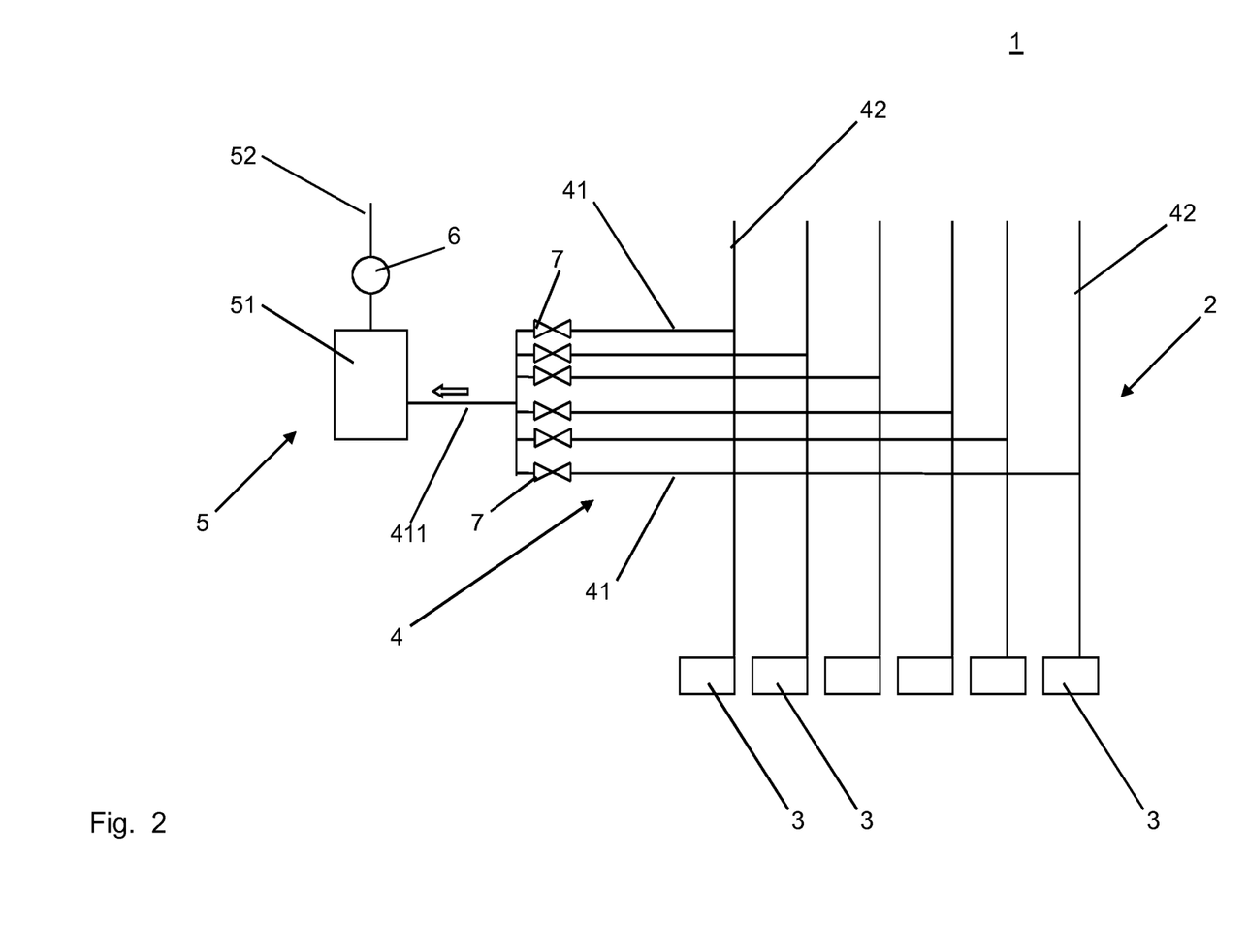
FIG. 2 illustrates a second embodiment of the present invention.

In FIG. 2 a machinery arrangement for a marine vessel 1 is generally indicated by reference sign 2. The machinery arrangement comprises a combustion unit 3, in this embodiment a number of combustion units. The combustion units may include diesel engines, oil-fired boilers, incinerators, etc.

Further, the machinery arrangement 2 comprises an exhaust duct assembly 4 for receiving an exhaust gas flow from the combustion units and for leading the exhaust gas flow to the atmosphere. The exhaust gases are treated by an exhaust gas cleaning system 5 arranged in the flow direction (main intended flow direction of the exhaust gas is indicated by a block arrow) of the exhaust gas. The exhaust gas cleaning system includes a cleaning device for sulphuric oxides ($SO_x$), e.g. a scrubber unit 51, which is provided with an exhaust gas pipe 52.

The exhaust gas duct assembly 4 includes a first branch pipe 41 leading to the exhaust gas cleaning system 5 and a second branch pipe 42 connected to and extending from the combustion unit 3, also leading to the atmosphere. An exhaust gas flow from the combustion unit 3 is firstly led into the second branch pipe 42 and further to the atmosphere, or alternatively from the second branch pipe 42 to the first branch pipe 41, through the exhaust gas cleaning system 5, and further to the atmosphere. This is discussed more in detail below.

In this embodiment, which includes a number of combustion units, each combustion unit 3 is connected to a first branch pipe 41 and a second branch pipe 42 respectively. The first branch pipes 41 converge in a common collecting branch 411, which connects the various first branch pipes and the scrubber unit 51.

A fan unit 6 is provided in flow connection with the first branch pipe 41 of each combustion unit 3. The fan unit 6 is arranged after the exhaust gas cleaning system 5 in the flow direction (block arrow) of the exhaust gas, in this embodiment in the exhaust gas pipe 52 of the scrubber unit 51.

Each of the first branch pipes 41 is provided with a first valve means 7, which advantageously is arranged to function as a shut-off valve and flow control valve.

In the following the operation of the machinery arrangement according to the invention shall shortly be described.

In operation, as one or more combustion units 3 are driven, exhaust gas is generated and is led into the exhaust gas duct assembly 4. The purpose is to draw substantially all of the exhaust gas by the fan unit 6 through the first branch pipes 41 and via the common collecting branch 411 through the scrubber unit 51 in order to clean the same. The second branch pipes 42 basically function as stand-by exhaust pipe for the respective combustion units 3, preferably so that a minimum of fresh air is provided to the scrubber unit 51 in order to prevent escape of un-cleaned exhaust gases.

The fan unit 6 is advantageously equipped with a frequency converter and/or guide vanes for flexible control of its appropriate function in relation to the drive mode of the respective combustion units 3. Back-flow of exhaust gas from the common collecting branch 411 to other combustion units is controlled by the first valve means 7 provided in each first branch pipe 41. The first valve means 7 are arranged to balance the flow in the active first branch pipes 41, i.e. the first branch pipes connected to a driven combustion unit 3. On the other hand, the first valve means 7 are also arranged to shut-off the flow in the inactive first branch pipes 41, i.e. the first branch pipes connected to a non-operational combustion unit 3.

This arrangement also ensures that the exhaust gas back pressure, with regard to each combustion unit 3, remains about the same or slightly lower than in a conventional machinery installation.

In case e.g. of malfunction of the scrubber unit 51, the first valve means 7 can be used to prevent the flow of hot exhaust gases to the scrubber unit. In a situation like this, the exhaust gases can be led directly through the second branch pipes 42 to the atmosphere, whereby exhaust gas emission control may be achieved by using fuel with lower sulphur content.

Each of the second branch pipes 42 are advantageously provided with a second valve means (not shown), a temperature sensor (not shown) and a flow sensor (not shown).

The temperature sensors in the second branch pipes 42 can be used to control that there is no inadvertent flow of hot, un-cleaned exhaust gases into the atmosphere. The flow sensors in the second branch pipes 42 can correspondingly be used to control the flow of fresh air, i.e. said minimum of fresh air discussed above, provided to the scrubber unit 51. The second valve means may regulate the flow as such in the second branch pipes.

For optimizing the overall operation of the exhaust gas cleaning system the fan unit 6, the first valve means 7, and also as appropriate the second valve means, the temperature sensor and the flow sensor, are connected to a central control unit (not shown) for monitoring the exhaust gas flow.

In conclusion, such a central control unit provides the means to ensure that a minimum of fresh air continuously can be sucked backwards from the active second branch pipes, that the air flow to and therefore the exhaust gas load (combined air and exhaust gas flow) to the scrubber unit is minimised, and that power consumption can be optimised. Furthermore, by minimizing the flow of cold air from the second branch pipes, any risk for condensation of sulphuric acid at the point of mixing of said cold air and hot exhaust gases can be avoided.

The deployment of the central control unit remains within the knowledge of a person skilled in the art, and is therefore not discussed in more detail in this connection.

Figure 3:
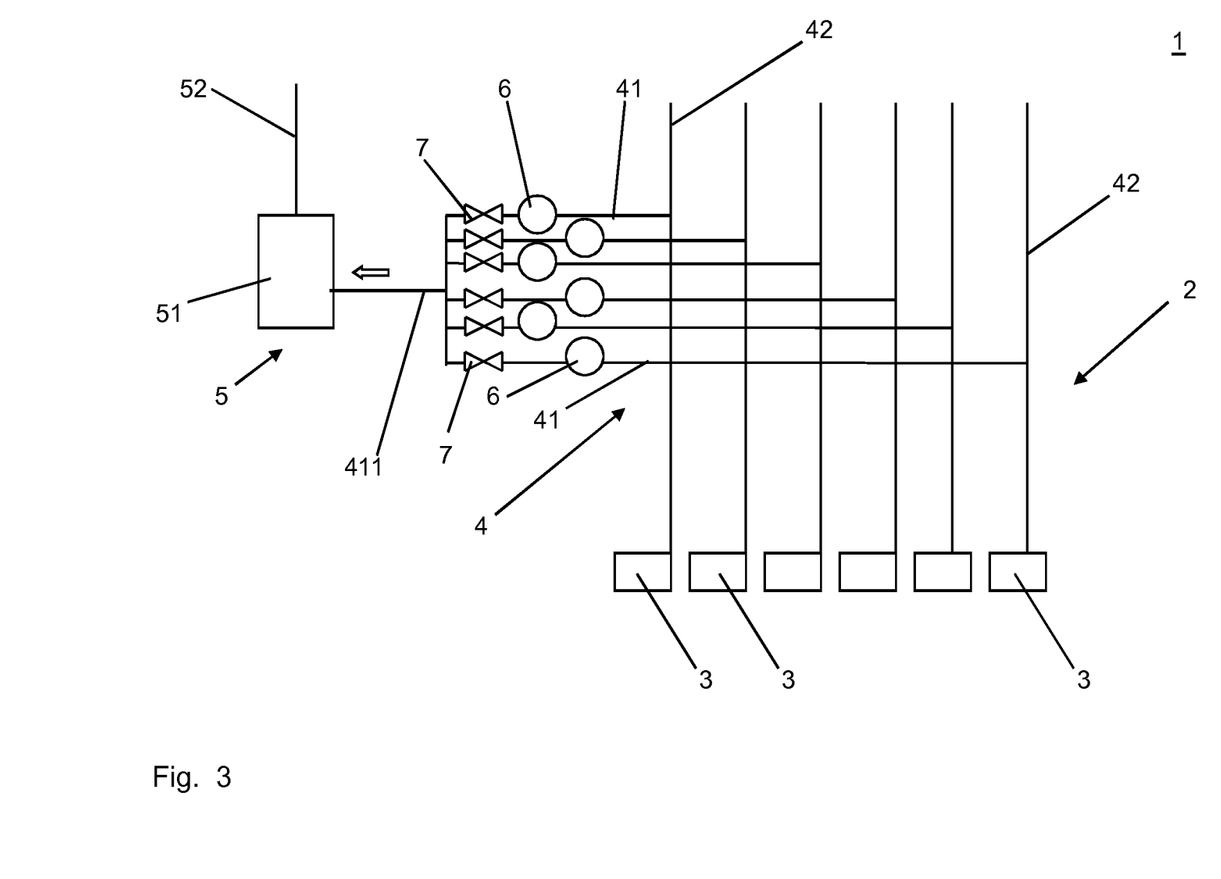
FIG. 3 illustrates a third embodiment of the present invention.

In FIG. 3 a machinery arrangement for a marine vessel 1 is generally indicated by reference sign 2. The machinery arrangement comprises a combustion unit 3, in this embodiment a number of combustion units. The combustion units may include diesel engines, oil-fired boilers, incinerators, etc.

Further, the machinery arrangement 2 comprises an exhaust duct assembly 4 for receiving an exhaust gas flow from the combustion units and for leading the exhaust gas flow to the atmosphere. The exhaust gases are treated by an exhaust gas cleaning system 5 arranged in the flow direction (main intended flow direction of the exhaust gas is indicated by a block arrow) of the exhaust gas. The exhaust gas cleaning system includes a cleaning device for sulphuric oxides ($SO_x$), e.g. a scrubber unit 51, which is provided with an exhaust gas pipe 52.

The exhaust gas duct assembly 4 includes a first branch pipe 41 leading to the exhaust gas cleaning system 5 and a second branch pipe 42 connected to and extending from the combustion unit 3, also leading to the atmosphere. An exhaust gas flow from the combustion unit 3 is firstly led into the second branch pipe 42 and further to the atmosphere, or alternatively from the second branch pipe 42 to the first branch pipe 41, through the exhaust gas cleaning system 5, and further to the atmosphere. This is discussed more in detail below.

In this embodiment, which includes a number of combustion units, each combustion unit 3 is connected to a first branch pipe 41 and a second branch pipe 42 respectively. A fan unit 6 is provided in flow connection with the first branch pipe 41 of each combustion unit 3. In this embodiment a fan unit 6 is arranged in each of the first branch pipes 41. The first branch pipes 41 are connected to the scrubber unit 51 by a common collecting branch 411.

Each of the first branch pipes 41 is further provided with a first valve means 7, which advantageously is arranged to function as a shut-off valve and flow control valve. The fan units 6 in each first branch pipe 41 are arranged before or downstream of the respective first valve means 7 in the flow direction (block arrow) of the exhaust gas.

In the following the operation of the machinery arrangement according to the invention shall shortly be described.

In operation, as one or more combustion units 3 are driven, exhaust gas is generated and is led into the exhaust gas duct assembly 4. The purpose is to draw substantially all of the exhaust gas by the fan unit 6 from the combustion units 3 and to push the exhaust gas through the first branch pipes 41 and via the common collecting branch 411 into the scrubber unit 51 in order to clean the same. The second branch pipes 42 basically function as stand-by exhaust pipe for the respective combustion units 3, preferably so that a minimum of fresh air is provided to the scrubber unit 51 in order to prevent escape of un-cleaned exhaust gases.

Each fan unit 6 is advantageously equipped with a frequency converter and/or guide vanes for flexible control of its appropriate function in relation to the drive mode of the respective combustion units 3. Exhaust gas flow-back from the common collecting branch 411 to other combustion units is controlled by the first valve means 7 provided in each first branch pipe 41. The first valve means 7 are arranged to balance the flow in the active first branch pipes 41, i.e. the first branch pipes connected to a driven combustion unit 3. On the other hand, the first valve means 7 are also arranged to shut-off the flow in the inactive first branch pipes 41, i.e. the first branch pipes connected to a non-operational combustion unit 3.

This arrangement also ensures that the exhaust gas back pressure, with regard to each combustion unit 3, remains about the same or slightly lower than in a conventional machinery installation.

In case e.g. of malfunction of the scrubber unit 51, the first valve means 7 can be used to prevent the flow of hot exhaust gases to the scrubber unit. In a situation like this, the exhaust gases can be led directly through the second branch pipes 42 to the atmosphere, whereby exhaust gas emission control may be achieved by using fuel with lower sulphur content.

Each of the second branch pipes 42 are advantageously provided with a sec- and valve means (not shown), a temperature sensor (not shown) and a flow sensor (not shown).

The temperature sensors in the second branch pipes 42 can thus be used to control that there is no inadvertent flow of hot, un-cleaned exhaust gases into the atmosphere. The flow sensors in the second branch pipes 42 can correspondingly be used to control the flow of fresh air, i.e. said minimum of fresh air discussed above, provided to the scrubber unit 51. The second valve means may regulate the flow as such in the second branch pipes.

For optimizing the overall operation of the exhaust gas cleaning system the fan unit 6, the first valve means 7, and also as appropriate the second valve means, the temperature sensor and the flow sensor, are connected to a central control unit (not shown) for monitoring the exhaust gas flow.

In conclusion, such a central control unit provides the means to ensure that a minimum of fresh air continuously can be sucked backwards from the active second branch pipes, that the air flow to and therefore the exhaust gas load (combined air and exhaust gas flow) to the scrubber unit is minimised, and that power consumption can be optimised. Furthermore, by minimizing the flow of cold air from the second branch pipes, any risk for condensation of sulphuric acid at the point of mixing of said cold air and hot exhaust gases can be avoided. The deployment of the central control unit remains within the knowledge of a person skilled in the art, and is therefore not discussed in more detail in this connection.

Figure 4:
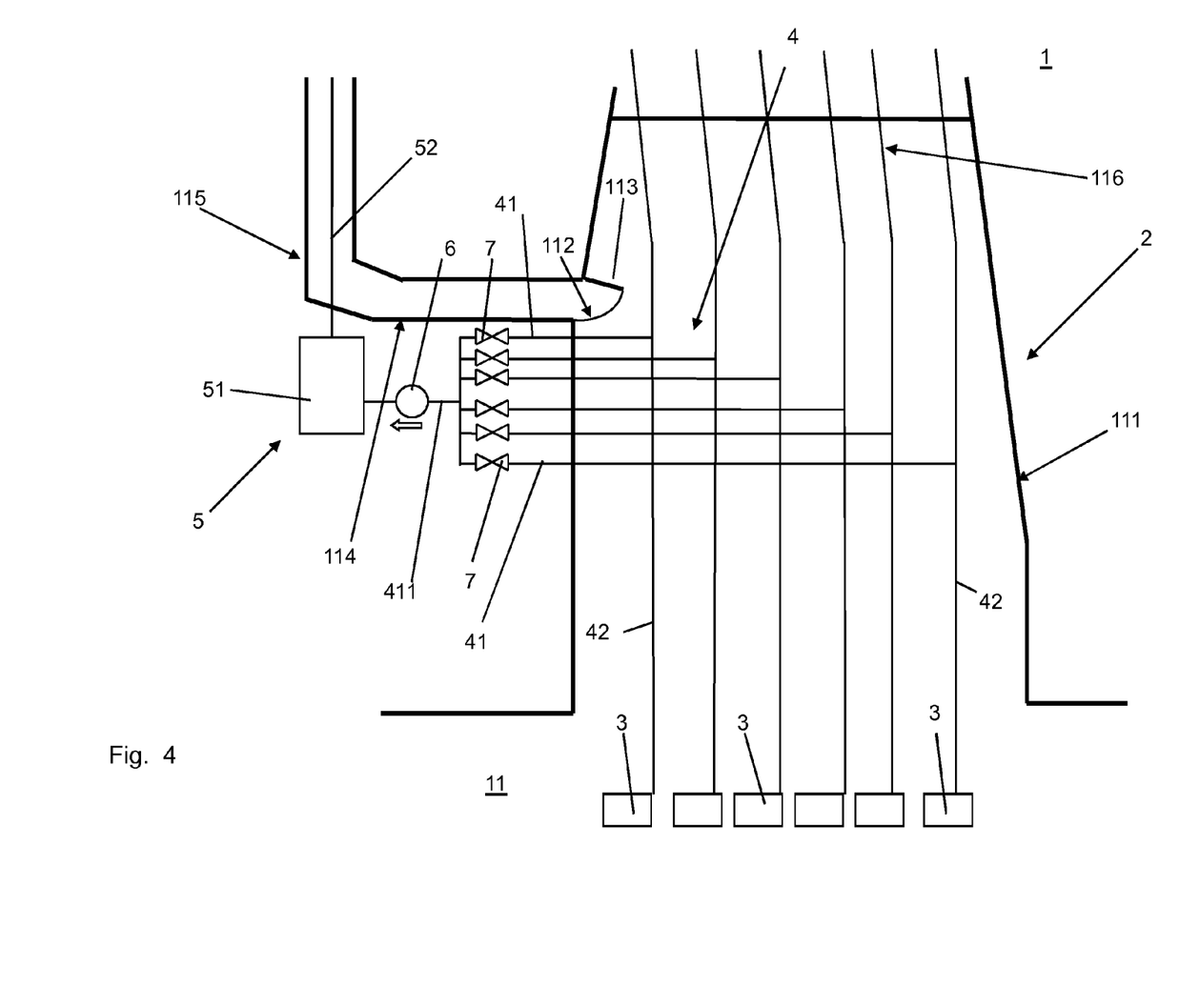
FIG. 4 illustrates a fourth embodiment of the present invention.

In FIG. 4 a machinery arrangement for a marine vessel 1 is generally indicated by reference sign 2. The machinery arrangement corresponds to the machinery arrangement discussed above in connection with FIG. 1 and comprises a combustion unit 3, in this embodiment a number of combustion units. The combustion units may include diesel engines, oil-fired boilers, incinerators, etc. This embodiment provides an additional feature as an alternative embodiment.

The combustion units are arranged in an engine room generally indicated by reference sign 11 (discussed more in detail below).

The machinery arrangement 2 comprises an exhaust duct assembly 4 for receiving an exhaust gas flow from the combustion units and for leading the exhaust gas flow to the atmosphere. The exhaust gases are treated by an exhaust gas cleaning system 5 arranged in the flow direction (main intended flow direction of the exhaust gas is indicated by a block arrow) of the exhaust gas. The exhaust gas cleaning system includes a cleaning device for sulphuric oxides ($SO_x$), e.g. a scrubber unit 51, which is provided with an exhaust gas pipe 52.

The exhaust gas duct assembly 4 includes a first branch pipe 41 leading to the exhaust gas cleaning system 5 and a second branch pipe 42 connected to and extending from the combustion unit 3, also leading to the atmosphere. An exhaust gas flow from the combustion unit 3 is firstly led into the second branch pipe 42 and further to the atmosphere, or alternatively from the second branch pipe 42 to the first branch pipe 41, through the exhaust gas cleaning system 5, and further to the atmosphere. This is discussed more in detail below.

In this embodiment, which includes a number of combustion units, each combustion unit 3 is connected to a first branch pipe 41 and a second branch pipe 42 respectively. A fan unit 6 is provided in flow connection with the first branch pipe 41 of each combustion unit 3. In this embodiment the fan unit 6 is arranged between the first branch pipes 41 and the exhaust gas cleaning system 5, in a common collecting branch 411, which connects the various first branch pipes and the scrubber unit 51.

Each of the first branch pipes 41 is provided with a first valve means 7, which advantageously is arranged to function as a shut-off valve and flow control valve.

In the following the operation of the machinery arrangement according to the invention shall shortly be described.

In operation, as one or more combustion units 3 are driven, exhaust gas is generated and is led into the exhaust gas duct assembly 4. The purpose is to draw substantially all of the exhaust gas by the fan unit 6 through the first branch pipes 41 and to push the exhaust gas via the common collecting branch 411 into the scrubber unit 51 in order to clean the same. The second branch pipes 42 basically function as stand-by exhaust pipe for the respective combustion units 3, preferably so that a minimum of fresh air is provided to the scrubber unit 51 in order to prevent escape of un-cleaned exhaust gases.

The fan unit 6 is advantageously equipped with a frequency converter and/or guide vanes for flexible control of its appropriate function in relation to the drive mode of the respective combustion units 3. Exhaust gas flow-back from the common collecting branch 411 to other combustion units is controlled by the first valve means 7 provided in each first branch pipe 41. The first valve means 7 are arranged to balance the flow in the active first branch pipes 41, i.e. the first branch pipes connected to a driven combustion unit 3. On the other hand, the first valve means 7 are also arranged to shut-off the flow in the inactive first branch pipes 41, i.e. the first branch pipes connected to a non-operational combustion unit 3.

This arrangement also ensures that the exhaust gas back pressure, with regard to each combustion unit 3, remains about the same or slightly lower than in a conventional machinery installation.

In case e.g. of malfunction of the scrubber unit 51, the first valve means 7 can be used to prevent the flow of hot exhaust gases to the scrubber unit. In a situation like this, the exhaust gases can be led directly through the second branch pipes 42 to the atmosphere, whereby exhaust gas emission control may be achieved by using fuel with lower sulphur content.

Each of the second branch pipes 42 are advantageously provided with a sec- and valve means (not shown), a temperature sensor (not shown) and a flow sensor (not shown).

The temperature sensors in the second branch pipes 42 can thus be used to control that there is no inadvertent flow of hot, un-cleaned exhaust gases into the atmosphere. The flow sensors in the second branch pipes 42 can correspondingly be used to control the flow of fresh air, i.e. said minimum of fresh air discussed above, provided to the scrubber unit 51. The second valve means may regulate the flow as such in the second branch pipes.

For optimizing the overall operation of the exhaust gas cleaning system the fan unit 6, the first valve means 7, and also as appropriate the second valve means, the temperature sensor and the flow sensor, are connected to a central control unit (not shown) for monitoring the exhaust gas flow.

In conclusion, such a central control unit provides the means to ensure that a minimum of fresh air continuously can be sucked backwards from the active second branch pipes, that the air flow to and therefore the exhaust gas load (combined air and exhaust gas flow) to the scrubber unit is minimised, and that power consumption can be optimised. Furthermore, by minimizing the flow of cold air from the second branch pipes, any risk for condensation of sulphuric acid at the point of mixing of said cold air and hot exhaust gases can be avoided. The deployment of the central control unit remains within the knowledge of a person skilled in the art, and is therefore not discussed in more detail in this connection.

Further, as shown in connection with this embodiment, the engine room 11 comprises an engine room casing 111 provided with an engine room ventilation outlet 112 with a fire damper 113 that can be closed, e.g. in case of fire. The engine room ventilation outlet 112 is in flow connection with, in other words leads to an enclosure 114, which encloses the exhaust pipe 52 of the scrubber unit 51. The enclosure 114 is advantageously located outside the fire damper 113 of the engine room casing 111. The enclosure is open-ended and is provided by a jacket portion 115 surrounding at least part of the exhaust gas pipe 52 of the scrubber unit 51.

The scrubber unit 51 is located outside the enclosure 114. The second branch pipes 42 are located in the funnel portion 116 of the engine room casing 111 and the first branch pipes 41 are at least partly located outside the engine room casing 111.

In operation, a heated air flow is provided by ventilation air from the engine room 11 through the ventilation outlet 112 into the enclosure 114. The heated air flow flowing through the enclosure 114 towards the jacket portion 115 heats the exhaust gas pipe 52 of the scrubber unit 51. The heated air flow is thus led into contact with and is mixed with the wet exhaust gas from the exhaust gas pipe 52 which is discharged into the atmosphere. Consequently, the resulting mixture has reduced relative humidity, reduced risk for condensed droplets, reduced opacity and increased buoyancy. The heated air flow also prevents cooling inside the exhaust gas pipe 52, thus avoiding undesired condensation.

Depending on the desired effect of the heated air flow from the engine room 11, the jacket portion 115 surrounds at least part of the exhaust gas pipe 52, i.e. advantageously ends somewhat below, at the same level, or somewhat above the outlet of the exhaust gas pipe 52. The jacket portion 115 may also be constructed as a lateral support of the exhaust gas pipe 52.

Although this enclosure arrangement is discussed only in connection with this particular embodiment (corresponding to the embodiment of FIG. 1) it is clear it can be deployed also in connection with the embodiments described in connection with FIGS. 2 and 3.

Figure 5:
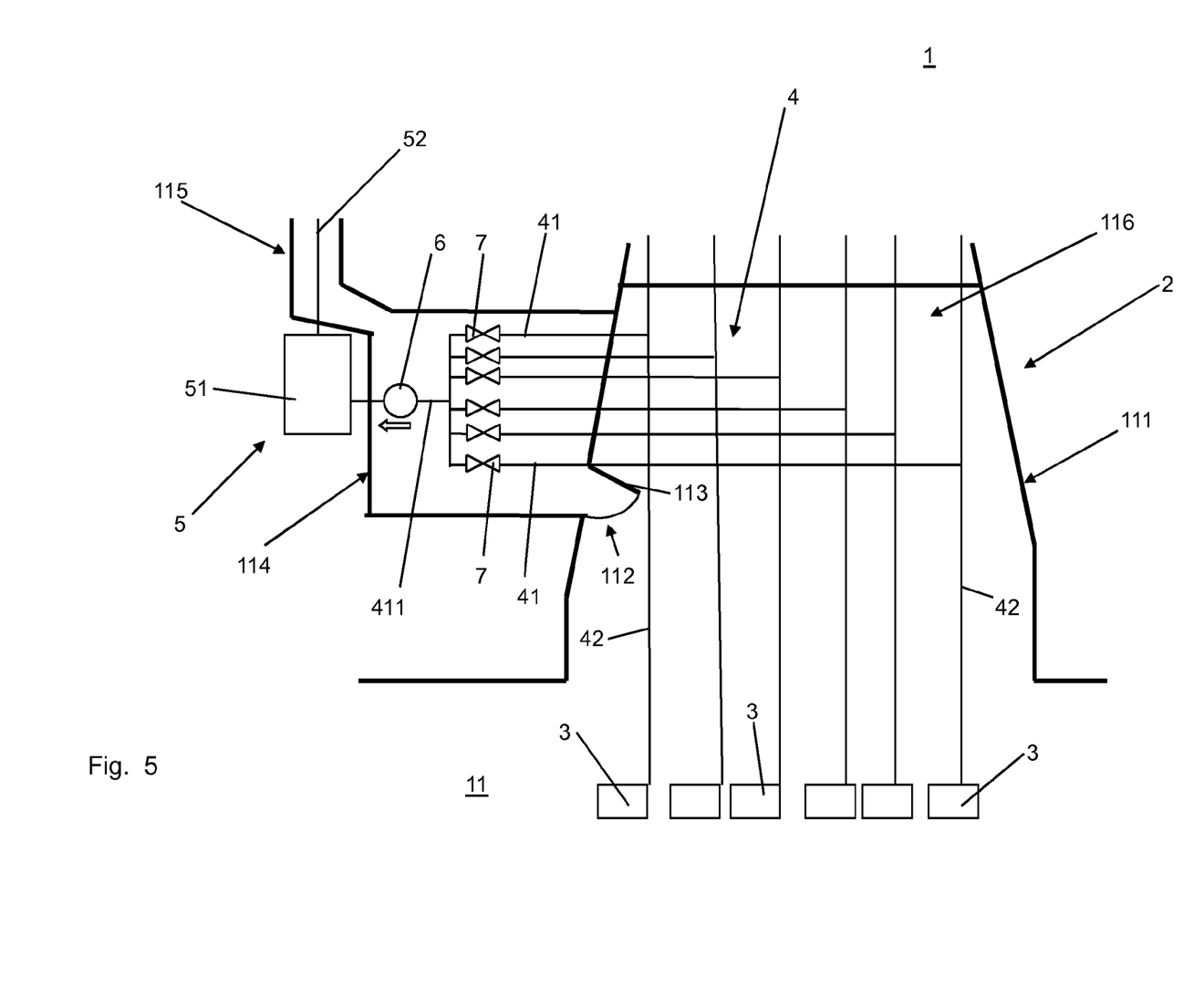
FIG. 5 illustrates a fifth embodiment of the present invention.

In FIG. 5 a machinery arrangement for a marine vessel 1 is generally indicated by reference sign 2. The machinery arrangement corresponds to the machinery arrangement discussed above in connection with FIG. 1 and comprises a combustion unit 3, in this embodiment a number of combustion units. The combustion units may include diesel engines, oil-fired boilers, incinerators, etc. This embodiment provides an additional feature as an alternative embodiment.

The combustion units are arranged in an engine room generally indicated by reference sign 11 (discussed more in detail below).

Further, the machinery arrangement 2 comprises an exhaust duct assembly 4 for receiving an exhaust gas flow from the combustion units and for leading the exhaust gas flow to the atmosphere. The exhaust gases are treated by an exhaust gas cleaning system 5 arranged in the flow direction (main intended flow direction of the exhaust gas is indicated by a block arrow) of the exhaust gas. The exhaust gas cleaning system includes a cleaning device for sulphuric oxides ($SO_x$), e.g. a scrubber unit 51, which is provided with an exhaust gas pipe 52.

The exhaust gas duct assembly 4 includes a first branch pipe 41 leading to the exhaust gas cleaning system 5 and a second branch pipe 42 connected to and extending from the combustion unit 3, also leading to the atmosphere. An exhaust gas flow from the combustion unit 3 is firstly led into the second branch pipe 42 and further to the atmosphere, or alternatively from the second branch pipe 42 to the first branch pipe 41, through the exhaust gas cleaning system 5, and further to the atmosphere. This is discussed more in detail below.

In this embodiment, which includes a number of combustion units, each combustion unit 3 is connected to a first branch pipe 41 and a second branch pipe 42 respectively. A fan unit 6 is provided in flow connection with the first branch pipe 41 of each combustion unit 3. In this embodiment the fan unit 6 is arranged between the first branch pipes 41 and the exhaust gas cleaning system 5, in a common collecting branch 411, which connects the various first branch pipes and the scrubber unit 51.

Each of the first branch pipes 41 is provided with a first valve means 7, which advantageously is arranged to function as a shut-off valve and flow control valve.

In the following the operation of the machinery arrangement according to the invention shall shortly be described.

In operation, as one or more combustion units 3 are driven, exhaust gas is generated and is led into the exhaust gas duct assembly 4. The purpose is to draw substantially all of the exhaust gas by the fan unit 6 through the first branch pipes 41 and to push the exhaust gas via the common collecting branch 411 into the scrubber unit 51 in order to clean the same. The second branch pipes 42 basically function as stand-by exhaust pipe for the respective combustion units 3, preferably so that a minimum of fresh air is provided to the scrubber unit 51 in order to prevent escape of un-cleaned exhaust gases.

The fan unit 6 is advantageously equipped with a frequency converter and/or guide vanes for flexible control of its appropriate function in relation to the drive mode of the respective combustion units 3. Exhaust gas flow-back from the common collecting branch 411 to other combustion units is controlled by the first valve means 7 provided in each first branch pipe 41. The first valve means 7 are arranged to balance the flow in the active first branch pipes 41, i.e. the first branch pipes connected to a driven combustion unit 3. On the other hand, the first valve means 7 are also arranged to shut-off the flow in the inactive first branch pipes 41, i.e. the first branch pipes connected to a non-operational combustion unit 3.

This arrangement also ensures that the exhaust gas back pressure, with regard to each combustion unit 3, remains about the same or slightly lower than in a conventional machinery installation.

In case e.g. of malfunction of the scrubber unit 51, the first valve means 7 can be used to prevent the flow of hot exhaust gases to the scrubber unit. In a situation like this, the exhaust gases can be led directly through the second branch pipes 42 to the atmosphere, whereby exhaust gas emission control may be achieved by using fuel with lower sulphur content.

Each of the second branch pipes 42 are advantageously provided with a second valve means (not shown), a temperature sensor (not shown) and a flow sensor (not shown).

The temperature sensors in the second branch pipes 42 can thus be used to control that there is no inadvertent flow of hot, un-cleaned exhaust gases into the atmosphere. The flow sensors in the second branch pipes 42 can correspondingly be used to control the flow of fresh air, i.e. said minimum of fresh air discussed above, provided to the scrubber unit 51. The second valve means may regulate the flow as such in the second branch pipes.

For optimizing the overall operation of the exhaust gas cleaning system the fan unit 6, the first valve means 7, and also as appropriate the second valve means, the temperature sensor and the flow sensor, are connected to a central control unit (not shown) for monitoring the exhaust gas flow.

In conclusion, such a central control unit provides the means to ensure that a minimum of fresh air continuously can be sucked backwards from the active second branch pipes, that the air flow to and therefore the exhaust gas load (combined air and exhaust gas flow) to the scrubber unit is minimised, and that power consumption can be optimised. Furthermore, by minimizing the flow of cold air from the second branch pipes, any risk for condensation of sulphuric acid at the point of mixing of said cold air and hot exhaust gases can be avoided. The deployment of the central control unit remains within the knowledge of a person skilled in the art, and is therefore not discussed in more detail in this connection.

Further, as shown in connection with this embodiment, the engine room 11 comprises an engine room casing 111 provided with an engine room ventilation outlet 112 with a fire damper 113 that can be closed, e.g. in case of fire. The engine room ventilation outlet 112 is in flow connection with, in other words leads to an enclosure 114, which surrounds the respective first branch pipes 41 of the combustion units 3 as well as the exhaust pipe 52 of the scrubber unit 51. The enclosure is open-ended and is provided by a jacket portion 115 surrounding at least part of the exhaust gas pipe 52 of the scrubber unit 51. In this embodiment, the fan unit 6 is also arranged within the enclosure 114. The scrubber unit 51 is located outside the enclosure 114. The second branch pipes 42 are located in the funnel portion 116 of the engine room casing 111.

The enclosure 114 has a cross sectional area larger than the engine room ventilation outlet 112 leading to the enclosure 114 from engine room 11. This minimizes flow resistance and impact on engine room ventilation. The enclosure 114 is advantageously located outside the fire damper 113 of the engine room casing 111.

In operation, the advantageously un-insulated first branch pipes 41 are ventilated by and provide additional heat to a heated air flow provided by ventilation air from the engine room 11 through the ventilation outlet 112. The heated air flow flowing towards the jacket portion 115 also heats the exhaust gas pipe 52 of the scrubber unit 51. The heated air flow is further led into contact with and is mixed with the wet exhaust gas from the exhaust gas pipe 52 which is discharged into the atmosphere. Consequently, the resulting mixture has reduced relative humidity, reduced risk for condensed droplets, reduced opacity and increased buoyancy. The heated air flow also prevents cooling inside the exhaust gas pipe 52, thus avoiding undesired condensation.

Depending on the desired effect of the heated air flow from the engine room 11, the jacket portion 115 surrounds at least part of the exhaust gas pipe 52, i.e. advantageously ends somewhat below, at the same level, or somewhat above the outlet of the exhaust gas pipe 52. The jacket portion 115 may also be constructed as a lateral support of the exhaust gas pipe 52.

Although this enclosure arrangement is discussed only in connection with this particular embodiment (corresponding to FIG. 1) it is clear it can be deployed also in connection with the embodiments described in connection with FIGS. 2 and 3.

It is clear that the number and type of combustion units can vary, whereby they can be connected to the same exhaust gas cleaning system. The combustion units may also be provided with exhaust gas boilers. In view of the location of the combustion units onboard a marine vessel, it is also possible to have more than one exhaust gas cleaning system. An exhaust gas cleaning system can use a scrubber unit that is run with sea water, fresh water, or a combination of both. The scrubber unit material can be corrosion resistant metal or glass-fibre reinforced plastic (GRP), whereby the latter has advantages in view of its lightness being located high up in the marine vessel.

The description and thereto related drawings are only intended to clarify the basic idea of the present invention. The invention may vary in detail within the scope of the ensuing claims.

The invention claimed is:

1. A machinery arrangement, the machinery arrangement comprising:
   a number of combustion units:
   an exhaust gas duct assembly, which includes a number of first branch pipes and a number of second branch pipes connected to corresponding combustion units for receiving an exhaust gas flow and for leading the exhaust gas flow to the atmosphere; and
   an exhaust gas cleaning system arranged in a flow direction of the exhaust gas, whereby each second branch pipe is connected to a corresponding one of the combustion units and each first branch pipe is connected to a corresponding one of the second branch pipes, wherein the first branch pipes are arranged to lead the exhaust gas flow to the exhaust gas cleaning system and further to the atmosphere;
   a fan unit provided in flow connection with the first branch pipes; and
   a first valve means provided in the first branch pipes;
   wherein the second branch pipes are arranged to function as stand-by exhaust pipes,
   wherein the machinery arrangement is the machinery arrangement of a marine vessel,
   wherein the combustion units are arranged in an engine room, the engine room is provided with an engine room ventilation outlet, and the engine room ventilation outlet is in flow connection with an enclosure,
   wherein the exhaust gas cleaning system comprises a scrubber unit provided with an exhaust gas pipe, and
   wherein the scrubber unit is arranged outside the enclosure.

2. The machinery arrangement according to claim 1, wherein the fan unit is arranged between the first branch pipes and the exhaust gas cleaning system.

3. The machinery arrangement according to claim 1, wherein the fan unit is arranged after the exhaust gas cleaning system in the flow direction of the exhaust gas.

4. The machinery arrangement according to claim 1, wherein the exhaust gas pipe is arranged in the enclosure.

5. A machinery arrangement for a marine vessel, the machinery arrangement comprising:
   a number of combustion units;
   an exhaust gas duct assembly, which includes a number of first branch pipes and a number of second branch pipes connected to the combustion units for receiving an exhaust gas flow and for leading the exhaust gas flow to the atmosphere;
   an exhaust gas cleaning system arranged in a flow direction of the exhaust gas, whereby each second branch pipe is connected to a corresponding one of the combustion units and each first branch pipe is connected to a corresponding one of second branch pipes, wherein the first branch pipe is arranged to lead the exhaust gas flow to the exhaust gas cleaning system and further to the atmosphere;
   a fan unit provided in flow connection with the first branch pipes; and
   a first valve means provided in the first branch pipes,
   wherein the second branch pipes are arranged to function as stand-by exhaust pipes,
   and
   wherein the first branch pipes are connected to a common collecting branch, which is connected to the exhaust gas cleaning system.

6. The machinery arrangement according to claim 5, wherein a fan unit is arranged in the common collecting branch.

7. A machinery arrangement for a marine vessel, the machinery arrangement comprising:
   a combustion unit;
   an exhaust gas duct assembly, which includes a first branch pipe and a second branch pipe and is connected to the combustion unit for receiving an exhaust gas flow and for leading the exhaust gas flow to the atmosphere;
   an exhaust gas cleaning system. arranged in a flow direction of the exhaust gas, whereby the second branch pipe is connected to the combustion unit and the first branch pipe is connected to the second branch pipe, wherein the first branch pipe is arranged to lead the exhaust gas flow to the exhaust gas cleaning system and further to the atmosphere;
   a fan unit provided in flow connection with the first branch pipe; and
   a first valve means provided in the first branch pipe,
   wherein the second branch pipe is arranged to function as a stand-by exhaust pipe,
   wherein the combustion unit is arranged in an engine room, the engine room is provided with an engine room ventilation outlet, and the engine room ventilation outlet is in flow connection with an enclosure, and
   wherein the first branch pipe is arranged in the enclosure.

8. A machinery arrangement for a marine vessel, the machinery arrangement comprising:
   a combustion unit;
   an exhaust gas duct assembly, which includes a first branch pipe and a second branch pipe and is connected to the combustion unit for receiving an exhaust gas flow and for leading the exhaust gas flow to the atmosphere;
   an exhaust gas cleaning system arranged in a flow direction of the exhaust gas, whereby the second branch pipe is connected to the combustion unit and the first branch pipe is connected to the second branch pipe, wherein the first branch pipe is arranged to lead the exhaust gas flow to the exhaust gas cleaning system and further to the atmosphere;
   a fan unit provided in flow connection with the first branch pipe; and
   a first valve means provided in the first branch pipe,
   wherein the second branch pipe is arranged to function as a stand-by exhaust pipe,
   wherein the combustion unit is arranged. in an engine room, the engine room is provided with an engine room ventilation outlet, and the engine room ventilation outlet is in flow connection with an enclosure, and
   wherein the enclosure is open-ended and is provided with a jacket portion surrounding at least part of the exhaust gas pipe.

9. A method for operating a machinery arrangement, the method comprising:
   leading an exhaust gas flow from a number of combustion units to an exhaust gas cleaning system through an exhaust gas duct assembly, which includes a number of first branch pipes and a number of second branch pipes, whereby each second branch pipe is connected to a corresponding one of the combustion units for receiving an exhaust gas flow and for leading the exhaust gas flow to the atmosphere, and each first branch pipe is connected to a corresponding one of the second branch pipes;
   leading the exhaust gas flow to the atmosphere, wherein the exhaust gas flow is led to the exhaust gas cleaning system through the first branch pipes, the exhaust gas flow is controlled by a fan unit deployed in flow connection with the first branch pipes and by a first valve means deployed in the first branch pipes, and the second branch pipes are deployed as stand-by exhaust pipes; and conveying a ventilation flow from an engine room, where the combustion unite are arranged, through a ventilation outlet to an enclosure, wherein the machinery arrangement is a machinery arrangement of a marine vessel, and wherein the exhaust gas cleaning system comprises a scrubber unit provided with an exhaust gas pipe, which scrubber unit is arranged outside the enclosure.

10. The method according to claim 9, wherein air is provided to the first branch pipes via the second branch pipes.

* * * * *